United States Patent [19]

Merrill

[11] Patent Number: 4,577,331
[45] Date of Patent: Mar. 18, 1986

[54] MULTIPLE RATE BASEBAND TRANSMITTER

[75] Inventor: Dana A. Merrill, Raleigh, N.C.

[73] Assignee: ITT Corporation, New York, N.Y.

[21] Appl. No.: 583,084

[22] Filed: Feb. 23, 1984

[51] Int. Cl.[4] ............................................. H04L 27/04
[52] U.S. Cl. ........................................ 375/17; 375/68
[58] Field of Search ................... 375/4, 17, 68, 59, 71; 455/608; 307/262; 360/39, 40, 41, 42

[56] References Cited

U.S. PATENT DOCUMENTS

| | | | |
|---|---|---|---|
| 3,643,162 | 2/1972 | Ady | 375/68 |
| 3,727,144 | 4/1973 | Senoo | 307/262 |
| 3,846,645 | 11/1974 | Kim et al. | 307/262 |
| 4,087,755 | 5/1978 | LeGrand | 375/68 |
| 4,121,118 | 10/1978 | Miyazaki | 375/17 |
| 4,412,141 | 10/1983 | Jacobsen | 375/17 |

Primary Examiner—Robert L. Griffin
Assistant Examiner—Stephen Chin
Attorney, Agent, or Firm—John T. O'Halloran; Jeffrey P. Morris

[57] ABSTRACT

The present invention relates to a baseband transmitter using a precision voltage reference and field effect transistor switches in an arrangement such that output amplitude variations due to power supply and transistor "on" voltage variations are virtually eliminated. The present invention results in a transmitter suitable for the generation of transmit signals conforming to different rate and/or frequency constraints. The data rate and output pulse characteristics of the transmitter are selected by a single 1-of-N switch selection. A common amplifier is provided for different data rates.

13 Claims, 2 Drawing Figures

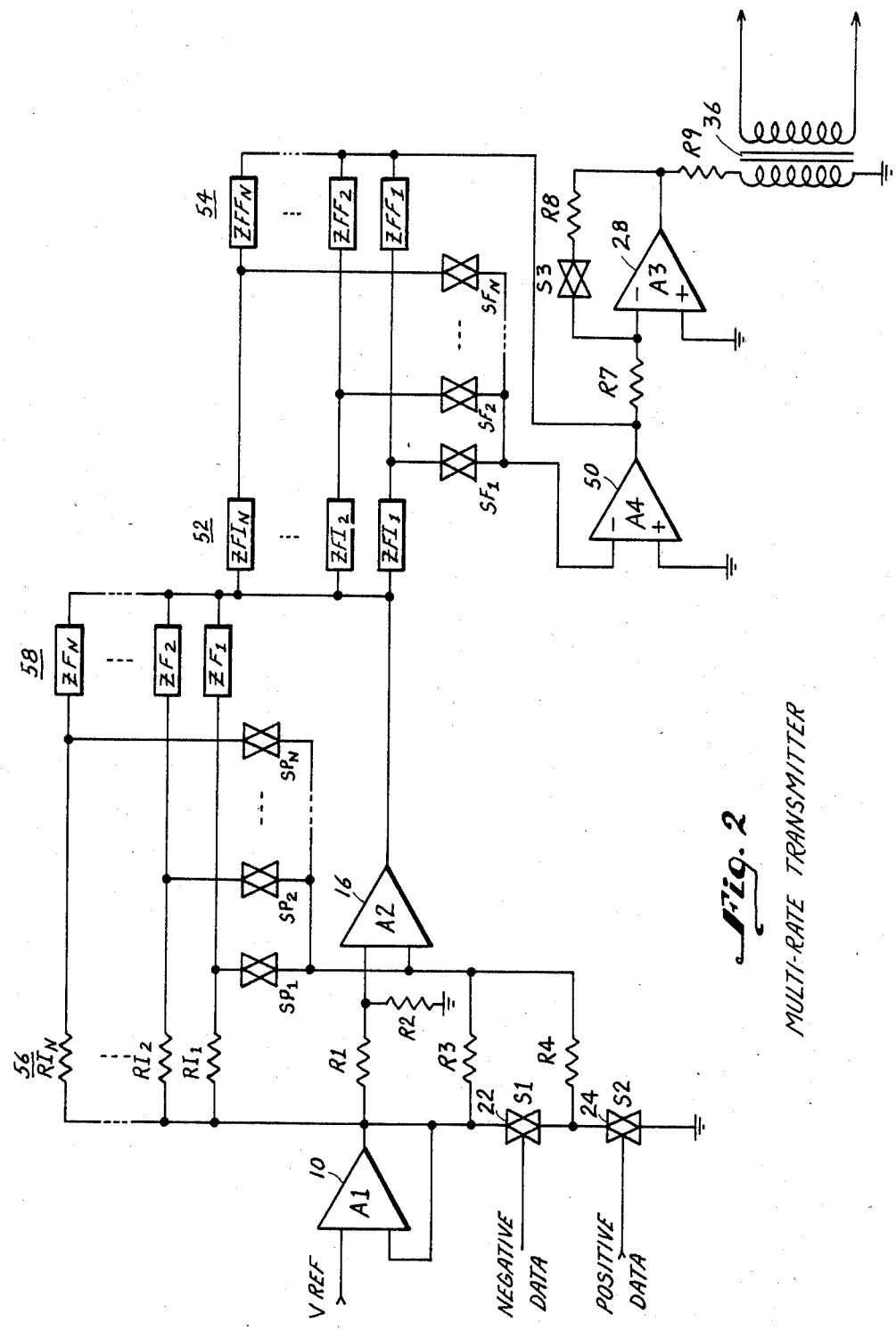
Fig. 2 MULTI-RATE TRANSMITTER

4,577,331

MULTIPLE RATE BASEBAND TRANSMITTER

CROSS REFERENCE TO RELATED APPLICATION

U.S. patent application Ser. No. 583,085, Multiple Rate Baseband Receiver, filed on even date herewith.

BACKGROUND OF THE INVENTION

1. Field of the Invention

The multiple rate baseband transmitter of the present invention relates to the conversion of two unipolar data signals, a signal controlling positive data and a signal controlling negative data, into a bipolar transformer coupled signal suitable for transmission over standard voice frequency telephone lines. Output pulses are derived which conform to frequency tolerances which may vary according to the data transmission rate.

2. Description of the Prior Art

Baseband data transmission systems of the prior art are typically constructed using saturating bipolar transistor drivers connected to an output transformer. Passive filtering is added to the output circuitry to meet frequency constraint requirements. The major problems with this prior art approach include poor output amplitude tolerance due to power supply variations and driver saturation tolerances, along with the need for complex filtering circuitry in the output stages.

An alternate baseband transmission approach of the prior art is to generate the output signal using low power bipolar switching transistors to generate the bipolar pulses, followed by active filtering, then buffering the transmit signal with a linear amplifier whose output is transformer coupled to the transmission line. This prior art approach reduces the driver saturation tolerance but still suffers poor tolerance in output amplitude due to supply voltage variations. Active filtering is used to reduce the complexity of required filter circuits.

SUMMARY OF THE INVENTION

The present invention relates to a baseband transmitter using a precision voltage reference and field effect transistor switches in an arrangement such that output amplitude variations due to power supply and transistor "on" voltage variations are virtually eliminated. The present invention results in a transmitter suitable for the generation of transmit signals conforming to different rate and/or frequency constraints. The data rate and output pulse characteristics of the transmitter are selected by a single 1-of-N switch selection. A common amplifier is provided for different data rates.

BRIEF DESCRIPTION OF THE DRAWINGS

FIG. 2 is a more detailed block diagram of the transmitter of FIG. 1.

DESCRIPTION OF THE PREFERRED EMBODIMENT

Figure 1:
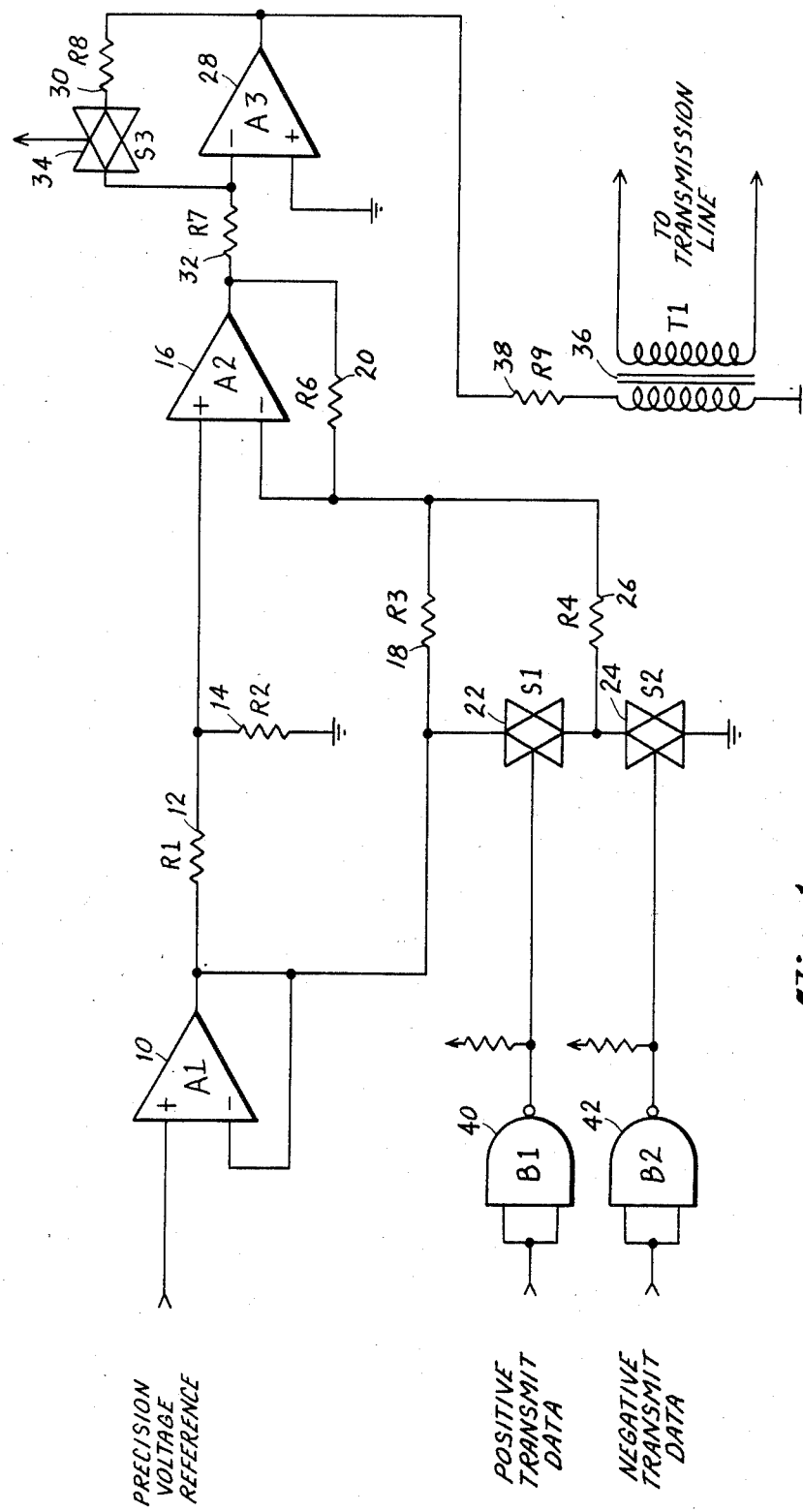
FIG. 1 illustrates a baseband transmitter in accordance with the present invention.

The basic transmitter of the present invention is shown by FIG. 1. Buffer amplifier 10 buffers a precision reference voltage for use by the transmitter. The reference voltage may originate, for example, from a Zener diode or from a power supply. Output pulse amplitude is controlled by this reference thereby eliminating power supply variation effects. Resistor R1 at 12 is selected to be the same value as resistor R2 at 14 and together form an input reference to amplifier 16 equal to half of the precision reference. Resistor R3 at 18 is the same value as resistor R6 at 20 resulting in a 0 volt output from amplifier 16 when both switches S1 and S2 at 22 and 24 respectively are "off". Switch S1 is preferably a field effect transistor controlled by the signal representing positive transmit data pulses. When switch S1 is turned "on", resistor R4 at 26 is connected to the buffered reference voltage and amplifier 16 performs the function of an inverting summing amplifier resulting in a negative output from amplifier 16. Similarly when switch S2 is turned "on", with switch S2 also a field effect transistor (FET) controlled by the signal representing negative transmit data pulses, resistor R4 is connected to ground resulting in a positive output from amplifier 16. Amplifier 28 amplifies and inverts the output pulses from amplifier 16. Resistor R8 at 30 is equal to resistor R4, therefore the output pulse amplitude is determined by the ratio of resistor R6 to resistor R7 at 32. Switch S3 at 34 is placed in series with resistor R8 so that the channel resistance of switch S3 added to the value of resistor R8 forms the total feedback resistance for amplifier 28 when switch S3 is continuously "on". Similarly, the channel resistance of switches S1 or S2 added to the value of resistor R4 forms the total resistance of the signal input resistance to amplifier 16. All three FET switches S1, S2 and S3 are preferably contained in the same integrated circuit, resulting in closely matched channel resistances. Switches S1, S2 and S3 may be comprised of a standard 4066 CMOS quad analog switch. Switches S1 and S2 cause amplifier 16 to generate a plus, a minus or a zero output depending upon which switch is "on". Switch S3 compensates for the resistance of switches S1 and S2. Therefore even though the value of the channel resistance may vary over a relatively large range, the resistance of the three FETs are the same. The value of resistor R4 added to the switch S1 or switch S2 channel resistance is equal to the value of resistor R8 added to the switch S3 channel resistance and the tal resistance cancel each other in the overall gain equations, eliminating amplitude errors due to transistor "on" voltages. The output of amplifier 28 is transformer coupled by transformer 36 to the transmission line through resistor R9 at 38 which determines the transmitter output impedance.

Bipolar or Alternate Mark Inversion (AMI data) from any source of such bipolar data (having positive and negative pulses) is coupled to a pair of level shifters 40 and 42. Positive transmit data (pulses) and negative transmit data (pulses) are coupled respectively to level shifters 40 and 42, which function to shift a 0 to 5 volt data input to a 0 to 12 volt output to switches S1 and S2.

The basic transmitter of FIG. 1 can be expanded in accordance with the present invention to form a multiple rate transmitter as shown with reference to FIG. 2, wherein like numbered elements function as described with reference to FIG. 1. An amplifier stage 50 is added at A4 which is configured as a filter whose characteristics are determined by the filter input network (ZFIx) and filter feedback network (ZFFx) as selected by the FET switches from $ZFI_{1-N}$ and $ZFF_{1-N}$ at 52 and 54 respectively. This filter stage is required to meet some frequency constraints for certain transmitter output pulse requirements. If this filter network is not required, ZFIx and ZFFx are simply comprised of resistors.

This filter section can also be used to adjust the output pulse amplitude as required by different transmitter output pulse requirements. Similarly, amplifier 16 at A2 may have reactive components in its feedback network to further shape the transmit pulse as well as reduce the slew rate requirements of amplifier 16. Resistor RIx chosen from resistors $RI_{1-N}$ at 56 may also be included to modify output pulse amplitude, but as before, selected resistors RIx in parallel with resistor R3 must be equal to the DC resistance of filter network filter ZFx chosen from $ZF_{1-N}$ at 58 to produce no output in the absence of transmit data. The FET switches which select the networks to provide various output frequency characteristics and output amplitudes are controlled by a single 1 of N switch selection which is decoded to select the desired combinations of switches to meet the requirements of the desired transmitter.

The various selected feedback components are chosen depending upon the desired data transmission rate. The output pulse coupled to the transmission line by transformer 36 are shaped by amplifier 50. Network $ZF_{1-N}$, feedback impedance, is preferably capacitive and shapes pulses from amplifier 16, depending upon the valve ZFx selected by switches $SP_1$, $SP_2$ ... $SP_N$. Network ZFIx provides gain and amplitude control for amplifier 50 and ZFIx of network $ZFI_{1-N}$ is selected by switches $SF_1$, $SF_2$ ... $SF_N$, as is the feedback impedance ZFFx from network $ZFF_{1-N}$. The described circuit generates output pulses with a controlled amplitude, from a common amplifier, for different data rates, merely by switching into the circuit different feedback components.

The present invention may be used as a Multiple Data Rate Baseband transmitter for use in the Dataphone Digital Service ITT product line. Four different data rates are used in this system; 2400, 4800, 9600, and 56000 baud. AMI (alternate mark inversion) data is transmitted over existing voice grade telephone wires between the telephone central office and the customer. The multiple data rate transmitter makes it possible to transmit any of the four data rates with the only modification required to the transmitter being a single switch selection. This eliminates the need for separate transmitters of the prior art. The Multiple Data Rate Transmitter (and receiver of Cross-Referenced application D.A. Merrill-1) is utilized, for example, in the ITT Type "A" Data Service Unit.

I claim:

1. A baseband transmitter for transmitting bipolar data on a transmission line comprising:
   a source of two unipolar data signals;
   a precision voltage reference for controlling the pulse amplitude of said bipolar data;
   first amplifier means for generating a positive or a negative pulse output in response to a switched input data signal at one input and said precision voltage input on the other input thereto;
   first switch means having a channel resistance and for generating said switched input data signal in response to said unipolar data signals;
   second amplifier means coupled to the output of said first amplifier means for generating amplified bipolar data having a controlled pulse amplitude, and second switch means in parallel with an input and the output of said second amplifier means for providing compensation for the channel resistance of said first switch means, and having a channel resistance.

2. A baseband transmitter in accordance with claim 1 further including:
   means for transformer coupling the generated amplified bipolar data output from said second amplifier means to said transmission line.

3. A baseband transmitter in accordance with claim 1 further including:
   buffer amplifier means for buffering said precision voltage reference.

4. A baseband transmitter in accordance with claim 1 wherein said source of two unipolar data signals includes:
   voltage level shifting means for increasing the voltage level of said unipolar data signals.

5. A baseband transmitter in accordance with claim 4 wherein said first switch means is comprised of a pair of switches, one of said pair for switching negative data and the other of said pair for switching positive data.

6. A baseband transmitter in accordance with claim 1 wherein the channel resistance of said first and said second switch means are substantially equal.

7. A baseband transmitter in accordance with claim 1 wherein said transmission line is a voice frequency telephone line.

8. A multiple data rate baseband transmitter for transmitting bipolar data at one or more data rates on a voice frequency transmission line comprising:
   a source of two unipolar data signals adapted for transmission at a plurality of data rates;
   a precision voltage reference for controlling the pulse amplitude of said bipolar data;
   first amplifier means for generating a positive or a negative pulse output in response to a switched input data signal at one input and said precision voltage input on the other input thereto;
   first switch means having a channel resistance and for generating said switched input data signal in response to any of said unipolar data signals;
   second amplifier means coupled to the output of said first amplifier means for generating amplified bipolar data having a controlled pulse amplitude;
   and third amplifier means coupled to the input of said second amplifier means and having a selectable filter characteristic to provide pulse shaping to match the bipolar data output of said first amplifier means at different data rates.

9. A multiple data rate baseband transmitter in accordance with claim 8 wherein said third amplifier means is coupled to a filter input network and a filter feedback network, each of said networks having a plurality of impedance elements selectable by a plurality of switches, such that a desired pulse shape is imparted to said bipolar data to match the data rate of said bipolar data.

10. A multiple data rate baseband transmitter in accordance with claim 9 further including:
    means for transformer coupling the generated amplified bipolar data output from said second amplifier means to said transmission line.

11. A multiple data rate baseband transmitter in accordance with claim 8 wherein said source of two unipolar data signals includes:
    voltage level shifting means for increasing the voltage level of said unipolar data signals.

12. A multiple data rate baseband transmitter in accordance with claim 8 further including:
    second switch means in parallel with an input and the output of said second amplifier means for providing compensation for the channel resistance of said first switch means.

13. A multiple data rate baseband transmitter in accordance with claim 12 wherein the channel resistance of said first and said second switch means are substantially equal.

* * * * *